United States Patent
Shintani et al.

(10) Patent No.: US 10,698,109 B2
(45) Date of Patent: Jun. 30, 2020

(54) USING DIRECTION OF ARRIVAL WITH UNIQUE AUDIO SIGNATURE FOR OBJECT LOCATION DETECTION

(71) Applicants: Sony Corporation, Tokyo (JP); Sony Interactive Entertainment Inc., Tokyo (JP)

(72) Inventors: Peter Shintani, San Diego, CA (US); Morio Usami, Tokyo (JP); Keith Resch, San Diego, CA (US)

(73) Assignees: Sony Corporation, Tokyo (JP); Sony Interactive Entertainment Inc., Tokyo (JP)

(*) Notice: Subject to any disclaimer, the term of this patent is extended or adjusted under 35 U.S.C. 154(b) by 359 days.

(21) Appl. No.: 15/875,263

(22) Filed: Jan. 19, 2018

(65) Prior Publication Data

US 2019/0227166 A1 Jul. 25, 2019

(51) Int. Cl.
*G01S 17/02* (2020.01)
*G01S 17/10* (2020.01)
(Continued)

(52) U.S. Cl.
CPC .............. *G01S 17/86* (2020.01); *G01S 5/16* (2013.01); *G01S 5/20* (2013.01); *G01S 5/22* (2013.01);
(Continued)

(58) Field of Classification Search
CPC . G01S 17/86; G01S 17/08; G01S 5/16; G01S 5/28; G01S 15/93; G01S 5/22;
(Continued)

(56) References Cited

U.S. PATENT DOCUMENTS 8,089,827 B2 * 1/2012 Carotenuto ............. G01S 11/16 367/118
8,203,910 B2 * 6/2012 Zhao ....................... G01S 11/16 367/127

(Continued)

FOREIGN PATENT DOCUMENTS

CA 2297344 A1 8/2000

OTHER PUBLICATIONS

Weisen Jiang, Zebin Cai, Meifeng Luo, Zhu Liang Yu, "A Simple Microphone Array for Source Direction and Distance Estimation", College of Automation Science and Engineering, South China University of Technology, Jun. 21-23, 2011.

*Primary Examiner* — Daniel Pihulic
(74) *Attorney, Agent, or Firm* — John L. Rogitz (57) ABSTRACT

Multiple independently movable devices are located upon a platform. On the platform is a directional microphone array. Each of the movable devices is assigned a unique audio signature, which may be a pulse train of chirps or a pseudo random signal or some other audio sequence that is unique to the respective device. Each movable device announces itself with its unique audio signature, and the platform's directional microphone system determines the location from which the unique audio signature comes from. For range, a difference between the time of flight (TOF) of the light relative to the sound signature is used. As another technique a unique audio signature may be an audio water mark concealed in normal audio which may be emitted by the movable device. The watermark provides the identifying information of each movable device.

13 Claims, 7 Drawing Sheets

(51) Int. Cl.
*G01S 5/20* (2006.01)
*G01S 5/22* (2006.01)
*H04R 1/40* (2006.01)
*H04R 3/00* (2006.01)
*G01S 17/86* (2020.01)
*G01S 5/16* (2006.01)
*G01S 5/28* (2006.01)
*G01S 15/93* (2020.01)
*G01S 17/08* (2006.01)
*G01S 17/89* (2020.01)
*G01S 15/86* (2020.01)

(52) U.S. Cl.
CPC ............... *G01S 5/28* (2013.01); *G01S 15/93* (2013.01); *G01S 17/08* (2013.01); *G01S 17/10* (2013.01); *H04R 1/406* (2013.01); *H04R 3/005* (2013.01); *G01S 15/86* (2020.01); *G01S 17/89* (2013.01)

(58) Field of Classification Search
CPC . G01S 17/10; G01S 5/20; G01S 15/86; G01S 17/89; H04R 1/406; H04R 3/005
See application file for complete search history.

(56) References Cited

U.S. PATENT DOCUMENTS

| | | |
|---|---|---|
| 2004/0141418 A1 | 7/2004 | Matsuo et al. |
| 2009/0190441 A1* | 7/2009 | Zhao ......................... G01S 5/30 367/128 |
| 2011/0103598 A1* | 5/2011 | Fukui ................ H04M 1/72569 381/57 |
| 2012/0214515 A1 | 8/2012 | Davis et al. |
| 2015/0301153 A1* | 10/2015 | Foxlin ..................... G01S 5/163 367/128 |
| 2017/0071017 A1* | 3/2017 | Klemans ................ H04B 11/00 |
| 2018/0231634 A1* | 8/2018 | Bietz ........................ G01S 5/28 |

* cited by examiner

USING DIRECTION OF ARRIVAL WITH UNIQUE AUDIO SIGNATURE FOR OBJECT LOCATION DETECTION

FIELD

The present application relates to technically inventive, non-routine solutions that are necessarily rooted in computer technology and that produce concrete technical improvements.

BACKGROUND

When multiple computerized devices interact with each other at close range, they may employ sensors such as cameras and laser range finders to map their environment. As understood herein, three-dimensional (3D) depth maps may be generated by each device of the other devices or objects within line of sight. Such 3D depth maps are generated typically using "time of flight" principles, i.e., by timing the periods from laser transmission to reception of each reflection, with regions of an object further away taking longer for the light to propagate to it and then return to a detector. The time of flight for each detected reflection by a sensor, typically a complementary metal oxide semiconductor (CMOS) camera, is converted to distance to generate the depth map.

SUMMARY

As understood herein, it would be advantageous for a system to be able to determine the location of independently movable devices located upon a platform without having to use two-way communication from each movable device to a central control system. It would be further advantageous to avoid the need for each movable device to be able to determine its own location on the platform.

Accordingly, a device includes a computer medium that is not a transitory signal and that includes instructions executable by a processor to receive, via at least one sound sensor, respective sound signals emitted by respective movable objects in an environment. The instructions are executable to identify each of the movable objects based at least in part on at least one unique characteristic in the respective sound signal, and to determine at least a bearing to each of the movable objects based at least in part on the respective sound signals. This information may be provided to the movable objects so that they may take evasive action, for instance, to avoid colliding with another object.

In some embodiments, the instructions may be executable to determine a range to each movable object based at least in part on time of flight (TOF) information. In such an embodiment, each sound signal can include a respective time stamp indicating time of transmission, and the TOF information can include a time period from the time of transmission to a time of reception of the respective sound signal by the sound sensor.

The sound sensor may include a directional array of microphones. In such an embodiment, the instructions may be executable to determine a range to each movable object based at least in part on TOF information that can include an electromagnetic TOF and a sonic TOF for each respective movable object.

In some examples, the at least one sound sensor includes plural microphones, and the instructions may be executable to determine range and bearing from a reference location to each of the movable objects using triangulation of the respective sound signals detected by plural of the microphones.

In some examples, the sound signals may include sequences of sonic pulses. Or, the sound signals may include pseudo random sonic signals unique to the respective devices. Yet again, the sound signals can include an audio water mark embedded in audio emitted by the respective movable objects. Combinations of these different types of sound signals may be used.

In another aspect, an assembly includes plural computerized devices. Each computerized device includes an actuating device to cause the device to move translationally on a platform and at least one speaker configured to emit acoustic energy. At least a first one of the computerized devices is programmed with instructions to cause the speaker to transmit a sound signal including a unique characteristic that identifies the respective device, and to receive information related to locations of other devices based on sound signals transmitted by the other devices.

In another aspect, a method includes receiving respective sound signals emitted by respective movable objects in an environment. The method also includes identifying each of the movable objects based at least in part on at least one unique characteristic in the respective sound signal, and determining at least a bearing to each of the movable objects based at least in part on the respective sound signals.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a UNIX operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Figure 1:
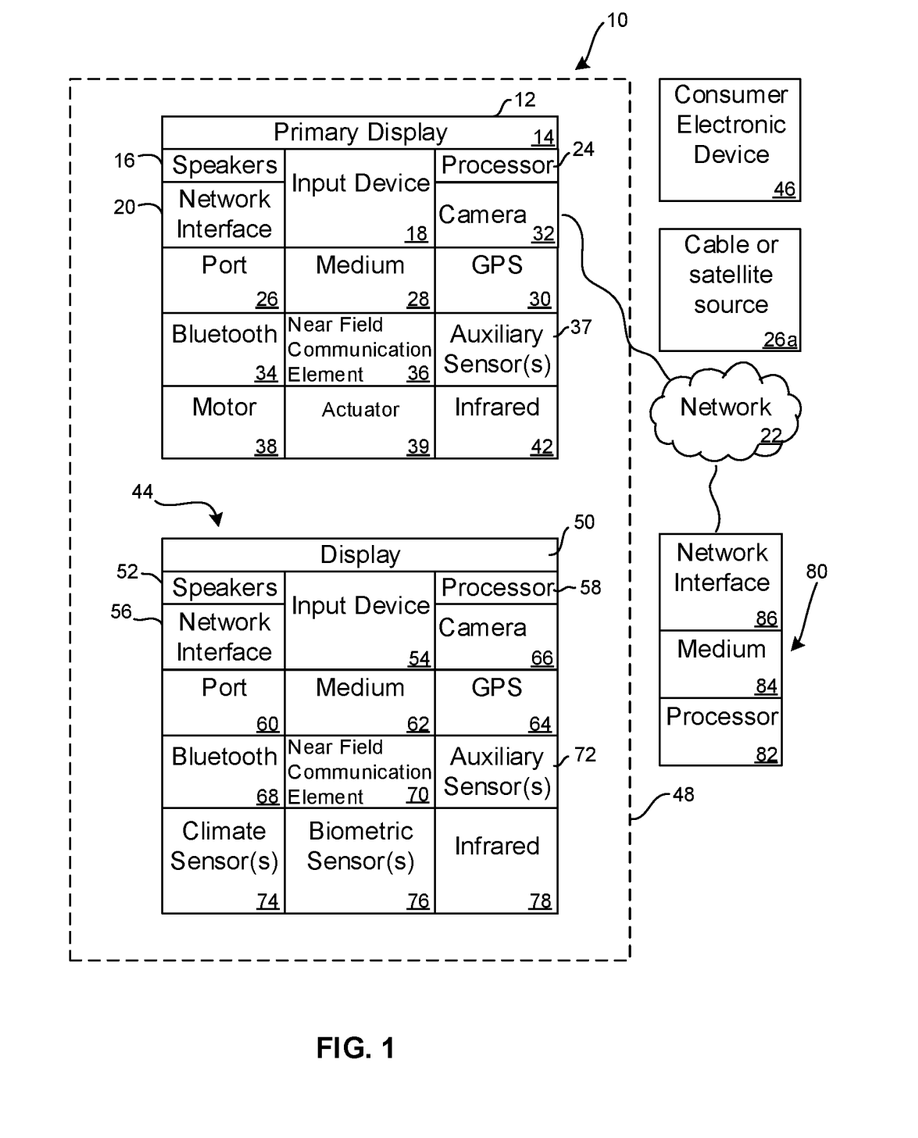
FIG. 1 is a block diagram of an example device.

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, a separate or integrated set top box, or a satellite receiver. Or, the source 26a may be a game console or disk player containing content that might be regarded by a user as a favorite for channel assignment purposes described further below.

The computerized device 12 may further include one or more computer memories 28 such as disk-based or solid-state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors, a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter ay be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFD) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 78 such as a laser or an IR data association (IRDA) device. A battery may be provided for powering the first device 44. The device 44 may communicate with the computerized device 12 through any of the above-described communication modes and related components. The second device 46 may include some or all of the components described above.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
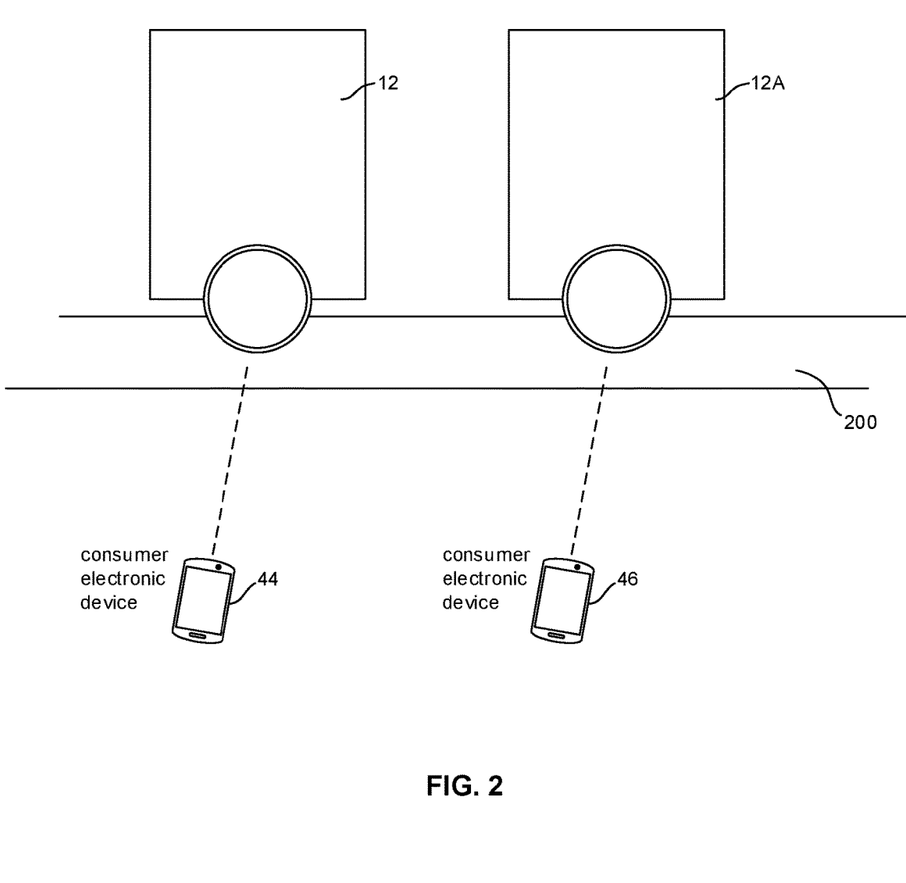
FIG. 2 is a block diagram of a system showing two devices, it being understood that more than two devices may be used.

FIG. 2 shows that multiple devices 12, 12A may be controlled by respective CE devices 44, 46 to interact on a surface 200 such as a flat planar surface.

Figure 3:
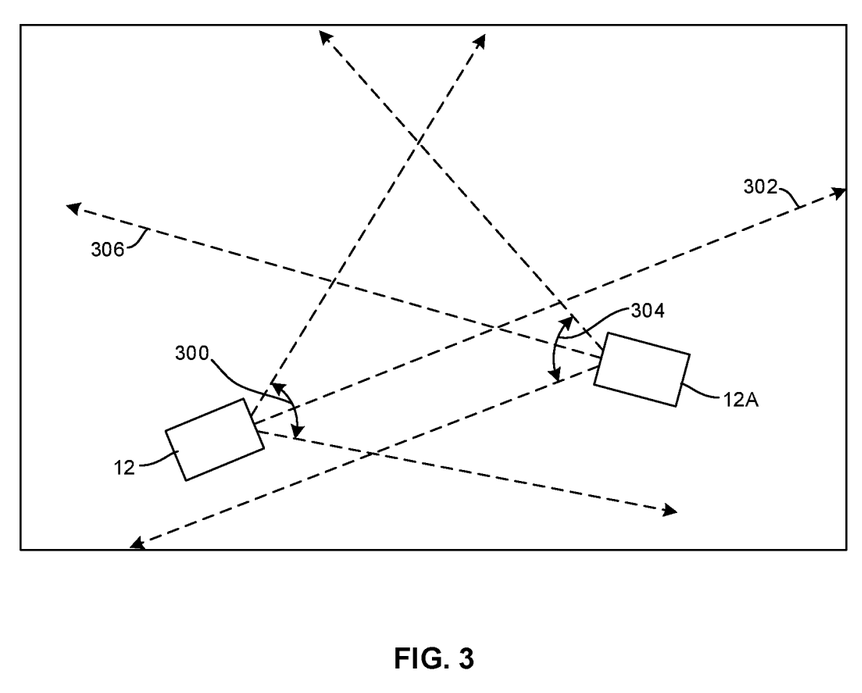
FIG. 3 is a schematic top view of two devices showing field of view of the devices.

FIG. 3 shows that the first device 12 may have a camera providing a field of view (FOV) with a FOV angle 300. The first device 12 may emit laser range-finding light such as IR light along one or more range finding axes 302. The camera may be implemented by a complementary metal oxide semiconductor (CMOS) camera that can detect both visible and infrared light so as to be able to produce still or video images along with detections of laser reflections for purposes of generating a depth map. The depth map subsequently may be used for object recognition, for navigation to avoid striking objects in the depth map, and so on.

Likewise, the second device 12A may have a camera providing a field of view (FOV) with a FOV angle 304. The first device 12 may emit laser range-finding light such as IR light along one or more range finding axes 306. More than two devices may be used. In the example shown, each device is within the FOV of the other device, and the FOVs of the devices overlap as shown. The devices 12, 12A emitting their respective laser beams establish an optical micro-mesh.

Figure 4:
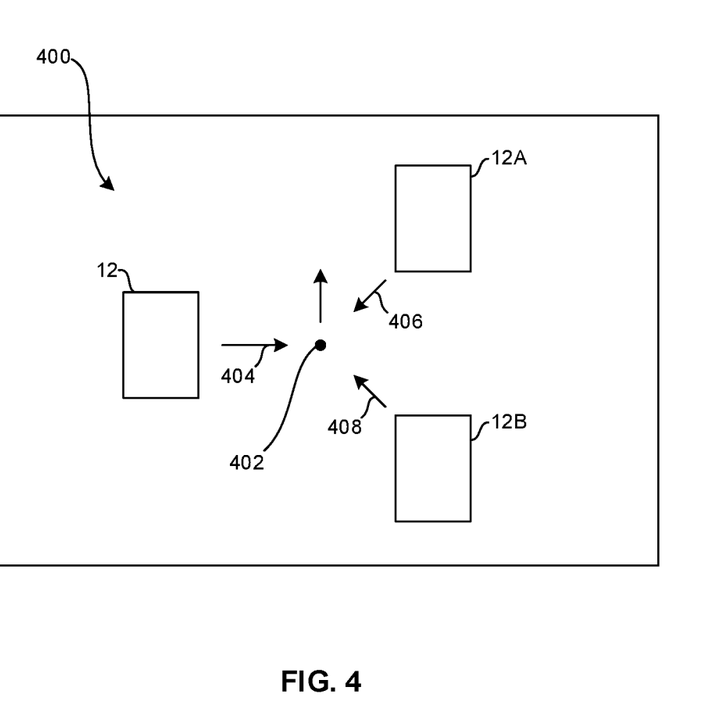
FIG. 4 is a schematic top view of three devices.

FIG. 4 illustrates a system 400 with three devices 12, 12A, 12B implemented by any of the devices described herein. Each device may generate its own depth map by imaging the other devices within its field of view. The depth maps can be aggregated together for a reference location that may be user-defined. In the example shown, a reference location 402 is located centrally in the system 400. Other reference locations may be modeled, including using one of the devices 12, 12A, 12B as a reference location. For description purposes, assume that the arrows 404, 406, 408 respectively represent the centerline axis of the field of view of each device 12, 12A, 12B.

Figure 5:
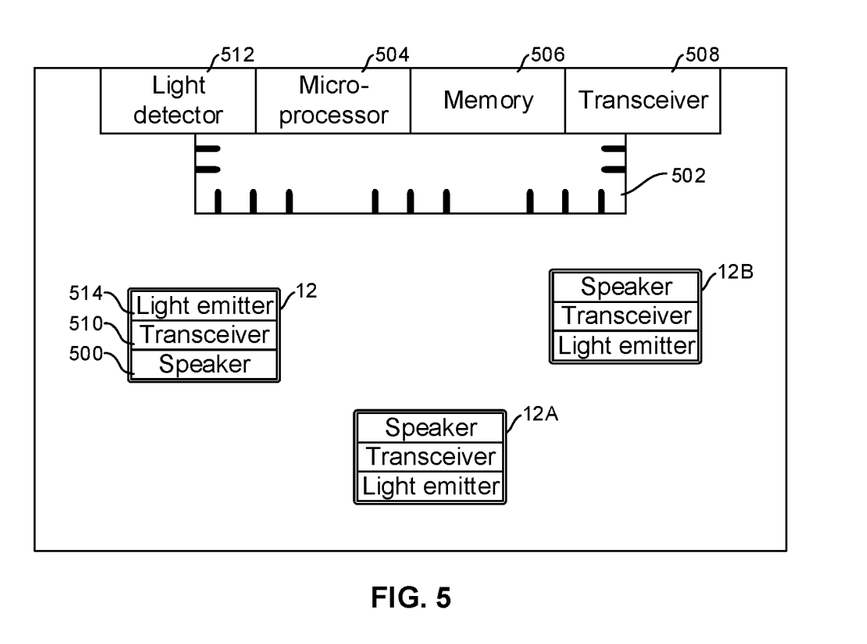
FIG. 5 is a schematic top view of three devices in an embodiment that detects the devices using a directional microphone array, optionally combining electromagnetic detection.

FIG. 5 illustrates that among other components mentioned above, the movable device 12, 12A, 12B can each have a respective audio speaker 500 which may be an ultrasonic speaker or speaker within the audible range. Audio from the speakers 500 can be detected by a directional microphone array 502 typically mounted on or near the platform on which the devices 12, 12A, 12B move. Signals from the directional microphone array 502 can be sent to one or more processors 504 accessing instructions on one or more computer storage media 506 and communicating if desired with the devices 12, 12A, 12B through one or more transceivers 508, which exchange wired or more typically wireless signals with transceivers 510 of the respective devices. The processor 504 may also receive light detection signals from one or more light detectors 512 representing light signals transmitted from one or more respective light emitters 514 of the respective devices 12, 12A, 12B. The light detector 512 may include, e.g., one or more photodiodes and the light emitters 514 may include, e.g., one or more light emitting diodes (LED). Infrared light, visible light, radar, and other forms of electromagnetic radiation may be used.

Figure 6:
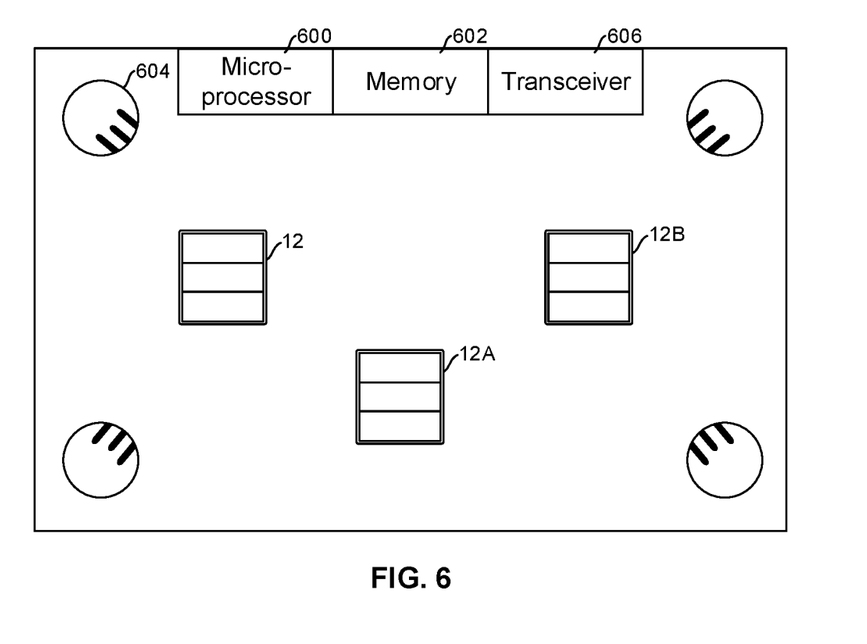
FIG. 6 is a schematic top view of three devices in an embodiment that triangulates sound from the devices to locate the devices.

FIG. 6 illustrates an alternate system in which one or more processors 600 accessing one or more computer storage media 602 can receive signals from plural (in the example shown, four) directional microphone arrays 604. The processor 600 may communicate with the devices 12, 12A, 12B through a transceiver 606.

The processors shown in FIGS. 5 and 6 may be implemented by any appropriate device including one of the devices 12 if desired. In any case, as set forth further below, the processors in FIGS. 5 and 6 can determine bearings (azimuth) to the devices 12, 12A, 12B relative to a reference point (e.g., the known locations of the directional microphone arrays) as well as ranges to each device relative to the reference and the identity of each device, communicating to each device the bearings and ranges to itself and to the other devices. The processor of each respective device, in knowing its bearing and range from the reference, can translate the bearing and range of other devices from the reference using geometric principles.

Multiple independently movable devices 12, 12A, 12B thus can be located upon a platform on which is a directional microphone array or plural arrays.

Figure 7:
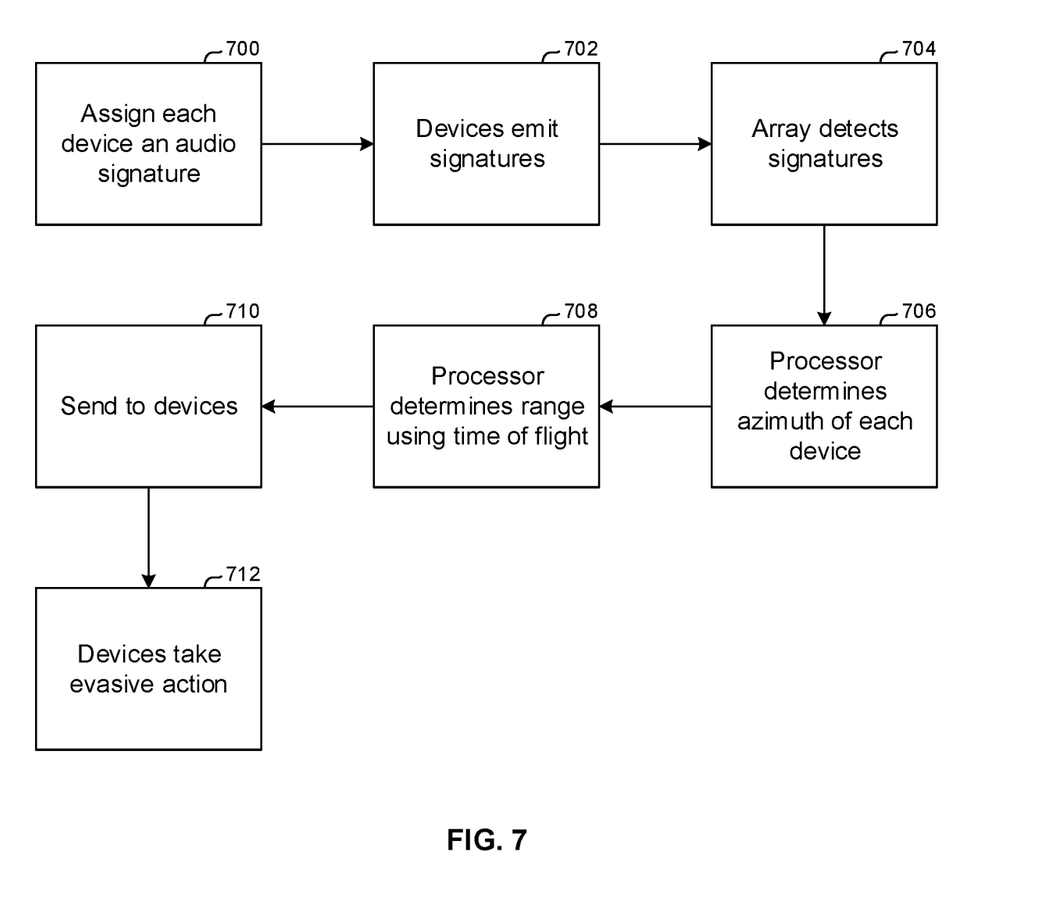
FIG. 7 is a flow chart of example logic consistent with FIG. 5.

Turning to FIG. 7 for further understanding as to the operation of the system shown in FIG. 5, at block 700 each of the movable devices 12, 12A, 12B is assigned a respective unique audio signature, which may be a pulse train of chirps or a pseudo random signal or some other audio sequence that is unique. Or, a unique audio signature of a device may be an audio water mark inserted into/concealed in audio played by the device. The watermark would provide the identifying information of each movable device.

Proceeding to block 702, each movable device 12, 12A, 12B can announce itself with its unique audio signature by playing the signature on the speaker(s) of the device. To this end, to avoid interference, the devices 12, 12A, 12B may be programmed to emit their respective signatures in respective time slots reserved for the respective devices in a time-based schedule.

At block 704 the platform's directional microphone array 502 detects an audio signature, sending the audio signature to the processor 504 which, at block 706, determines the bearing from which the unique audio signature was received based on the signal from the directional microphone array, which carries the directional information within it. The unique audio signature is also correlated (e.g., using a lookup table stored in the medium 506) with the identity of the device that emitted the signature. Thus, both bearing, and identity of the emitting device are identified at block 706.

Understanding that knowledge of the range or distance to each independently movable object may sometimes need to be known depending on the application, radial distance from the reference point also can be determined by the system shown in FIG. 5 at block 708 in FIG. 7. In an example embodiment, this may be done by exploiting the speed difference between time of flight (TOF) of light relative to the TOF of sound. Hence the location of each device 12, 12A, 12B in two dimensions can be determined for each movable device that is located on the platform. The locations of each device relative to the reference point may be sent to the devices 12, 12A, 12B at block 710, for various purposes including for enabling each device to take evasive action at block 712 to avoid colliding with another device.

In one example, determining range to each device may include programming each device to emit light from its respective light emitter 514 simultaneously with emitting its unique audio signature. Assume that this simultaneous emission occurs at a time $T_0$ and that the light detector 512 is substantially co-located with the microphone array 502. Then distance to the emitting device from the reference point (at which the array and light detector are located) may be determined as follows:

$$D = L(T_L - T_0) \text{ or } D = S(T_S - T_0), \text{ where}$$

$T_0 = (LT_L - ST_S)/(L-S)$, where L=speed of light in propagation medium air), S=speed of sound in medium, $T_L$=identified time of receipt of light signal from device, and $T_S$=identified time of receipt of sound signal from device.

Alternatively, to using a TOF differential between light and sound, the system of FIG. 5 may be used to determine location (both bearing and range from the microphone array) by eliminating EM radiation emission, detection, and processing hardware and software overhead and instead causing each device to insert a timestamp at the beginning of each emitted sound signal indicating the time of transmission of the signal ($T_0$ in the above equations). The directional array outputs a signal representative of device ID (owing to the unique signature of the device carried in the sound) and bearing. Then, range is determined by $D = S(T_S - T_0)$.

Figure 8:
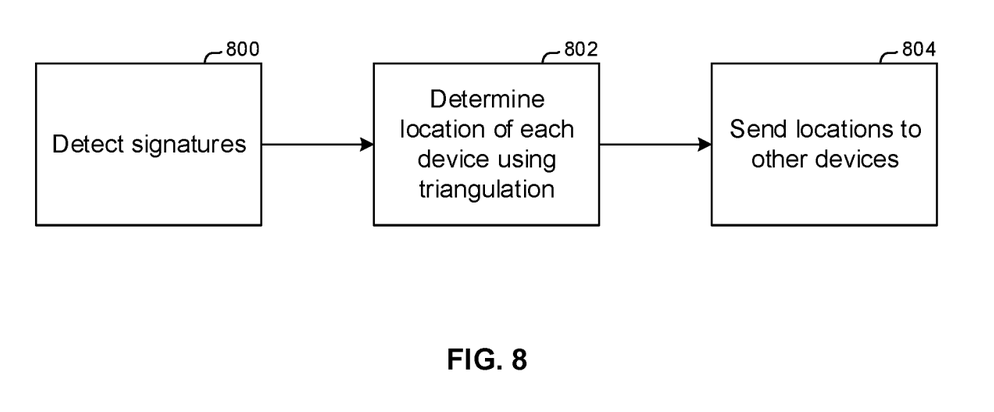
FIG. 8 is a flow chart of example logic consistent with FIG. 6.

The system of FIG. 6 adds multiple directional microphone arrays while saving on EM radiation emitting, detecting, and processing overhead and by not requiring a timestamp to be inserted into the acoustic signature signal. FIG. 8 illustrates.

As was the case in FIG. 7, each movable device is assigned a unique acoustic ID which it emits to identify itself, with the unique signatures being detected at block 800. The location of a detected device is then determined at block 802 through triangulation, i.e., the location of a device emitting its acoustic signature is the location at which the lines of bearing to the emission from each of the arrays 604 in FIG. 6 intersect. The locations are sent if desired to the other devices at block 804 for use as described above.

While particular techniques and machines are herein shown and described in detail, it is to be understood that the subject matter which is encompassed by the present invention is limited only by the claims.

What is claimed is:

1. A device comprising:
   at least one processor configured with instructions to:
   receive, via at least one sound sensor, respective sound signals emitted by respective movable objects in an environment, each sound signal establishing a respective audio signature unique to the respective moveable object;
   identify each of the movable objects based at least in part on at least one unique characteristic in the respective sound signal; and
   determine at least a bearing to each of the movable objects based at least in part on the respective sound signals, wherein at least one of the sound signals comprises a pseudo random sonic signal that is unique to the respective device.

2. The device of claim 1, wherein the instructions are executable to:
   determine a range to each movable object based at least in part on time of flight (TOF) information.

3. The device of claim 2, wherein each sound signal comprises a respective time stamp indicating time of transmission, and the TOF information comprises a time period from the time of transmission to a time of reception of the respective sound signal by the sound sensor.

4. The device of claim 1, wherein the at least one sound sensor comprises a directional array of microphones.

5. The device of claim 4, wherein the instructions are executable to:
   determine a range to each movable object based at least in part on time of flight (TOF) information, the TOF information comprising an electromagnetic TOF and a sonic TOF for each respective movable object.

6. The device of claim 1, wherein the at least one sound sensor comprises plural microphones, and the instructions are executable to:
   determine range and bearing from a reference location to each of the movable objects using triangulation of the respective sound signals detected by plural of the microphones.

7. The device of claim 1, wherein at least one of the sound signals comprises a sequence of sonic pulses.

8. The device of claim 1, comprising at least one sound sensor.

9. A device comprising:
   at least one processor configured with instructions to:
   receive, via at least one sound sensor, respective sound signals emitted by respective movable objects in an environment, each sound signal establishing a respective audio signature unique to the respective moveable object;
   identify each of the movable objects based at least in part on at least one unique characteristic in the respective sound signal; and
   determine at least a bearing to each of the movable objects based at least in part on the respective sound signals, wherein at least one of the sound signals comprises an audio water mark embedded in audio emitted by the respective movable object.

10. An assembly comprising:
    plural computerized devices;
    each computerized device comprising at least one actuating device to cause the device to move translationally on a platform and at least one speaker configured to emit acoustic energy;

a first one of the computerized devices being programmed with instructions to:

cause the at least one speaker to transmit a sound signal comprising a unique characteristic that identifies the respective device; and receive information related to locations and identities of other devices based on respective sound signals transmitted by the other devices, the respective sound signals having characteristics unique to the respective devices.

11. The assembly of claim 10, wherein each computerized device comprises at least one emitter of electromagnetic (EM) radiation.

12. The assembly of claim 11, wherein the instructions are executable to cause the emitter to emit EM radiation simultaneously with the at least one speaker transmitting the sound signal.

13. The assembly of claim 10, wherein the instructions are executable to cause information indicating time of transmission of the sound signal to be carried in the sound signal.

* * * * *